Feb. 20, 1940.  E. D. WILCOX ET AL  2,190,901
DRILL HOLE APPARATUS
Filed Sept. 13, 1938    2 Sheets-Sheet 2
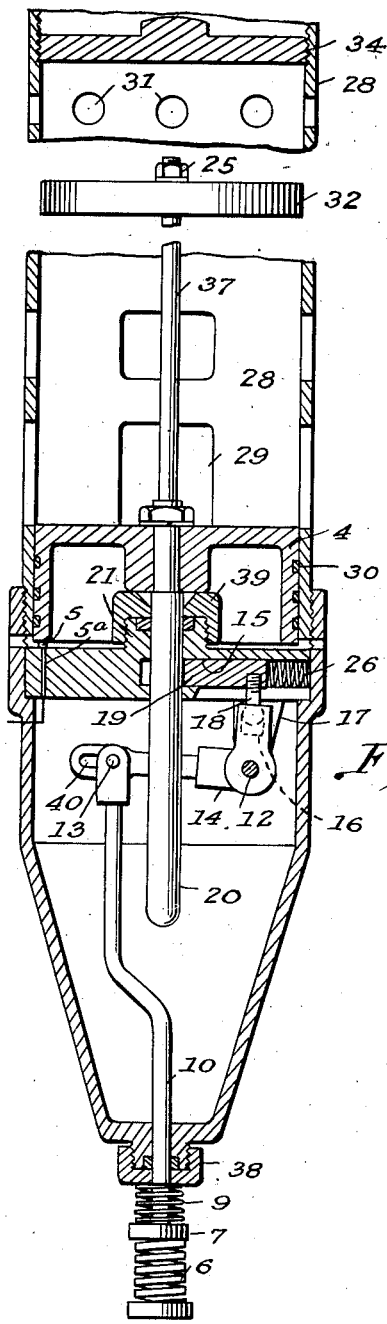
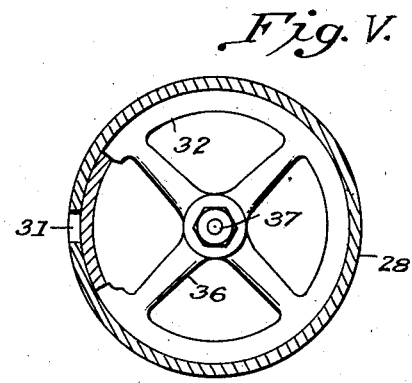
Fig. V.
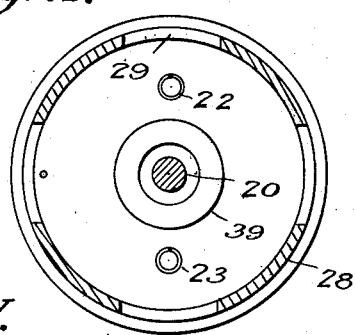
Fig. VI.
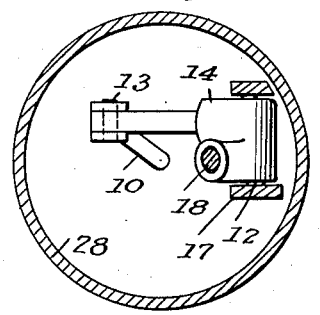
Fig. VII.
Inventors
EUGENE DAVIS WILCOX and
JOHN RICHARDSON WILCOX.
By Edward B. Beale
Attorney Patented Feb. 20, 1940

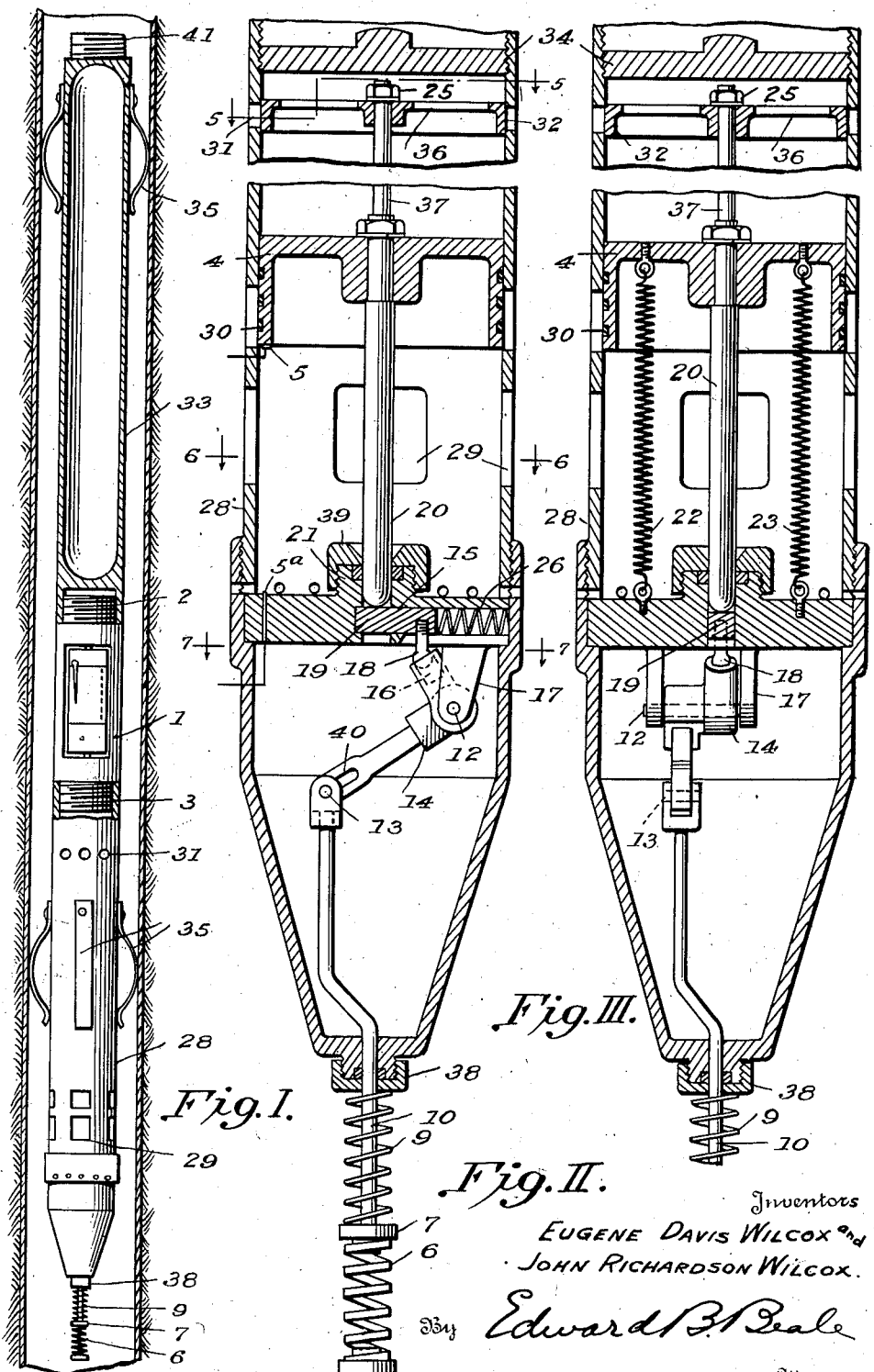

2,190,901

UNITED STATES PATENT OFFICE 2,190,901

DRILL HOLE APPARATUS

Eugene Davis Wilcox and John Richardson Wilcox, Tyler, Tex.

Application September 13, 1938, Serial No. 229,732

7 Claims. (Cl. 166—19)

Our invention relates broadly to apparatus and method for surveying or treating wells.

More particularly, our invention refers to oil well logging and specifically to an assembly adapted to carry a recording instrument or the like to the base of an oil well and to return to the surface.

It is therefore an object of this invention to provide an assembly adapted to be dropped or pumped into liquid-filled wells to measure and record the deviation from the vertical. It is a further object of our invention to provide an assembly adapted to return automatically to the surface without the use of wires or other retrieving means.

It is desired to produce a graphic representation of the deviation and one method of recording the data is on a graph which is traced continuously as the assembly falls or rises through the well hole. Therefore, it is an object of our invention to provide an assembly which may be dropped into a well and make an automatic record of the deviation of the well at all points along the drill pipe.

Our invention has the advantage of excluding the use of a wire line or the necessity of pulling the string of pipe to obtain the recordings. The advantages of our invention also include the fact that a continuous record is obtained and the amount of deviation at any point may be read directly from the record. Our invention provides an assembly which may be dropped into the well and automatically record the deviation of the well so that a complete log is obtained.

Broadly, our invention contemplates the provision of an assembly for use in oil wells which comprises a submerging, recording, and lifting chamber. The submerging chamber is provided with a suitable ballast release mechanism which is actuated on reaching the bottom of the well. Our assembly operates as a free body, submerging and then rising after the release of a suitable ballast making it unnecessary to use a retrieving line or to pull the string of pipe to obtain the recordings.

By taking advantage of the time element involved in descent of the assembly which may be indicated by a clock reading or recorded by the graph which has been traced, the depth of the hole may be calculated. This is the calculated distance knowing the weight of the assembly and time of fall in a fluid of known density.

Our assembly may comprise three sections including a submerging, a recording, and a lifting chamber, the entire assembly being adapted to be dropped as one into the mud- or oil-filled drill hole. Likewise, it is adapted to return to the surface as a unit after the ballast has been released. On both the downward and upward movement through the well, recordings are made and a check thereby may be obtained. The returning assembly may travel at a different rate and due consideration must be given to that fact when correlating the two readings. In this manner a true log of the drill hole is obtained at any point along the drill pipe and at the point where the bit is working.

It is not necessary that rotation of the assembly be prevented since it is contemplated that the recording mechanism will be mounted on a rotatable frame and therefore will give an accurate recording regardless of the rotation of the assembly in passing through the well. The assembly may be provided with bowed resilient arms, or other suitable means, tending to bear against the well pipe to keep the assembly parallel to the axis of the drill pipe but not retarding the movement within or along the well bore.

Referring to the drawings wherein our invention is represented by diagram:

Figure I is a view showing in vertical longitudinal section one form of our complete assembly.

Figures II and III are views showing the ballast release trap in a closed position.

Figure IV is a view showing the ballast release trap in an open position.

Figures V, VI, and VII are sections taken at 5—5, 6—6, and 7—7 in Figure II.

The measuring and recording apparatus may be positioned within the recording chamber 1 and connected to the lifting chamber 33 and submerging chamber 28 as shown in Figure I. The upper and lower ends of the recording chamber are adapted for threaded engagement with the lifting and submerging sections at 2 and 3, respectively.

Any suitable recording mechanism may be used. In one embodiment of our invention the apparatus depends upon gravity for its action. One such instrument comprises broadly a rotatable frame, a pendulum, an overbalance, and a recording strip or disc. The rotatable frame may be provided with trunnions or other means permitting the frame to revolve and maintain the pendulum in an operable position.

The pendulum preferably is pivotally mounted at a point removed from the longitudinal axis of the chamber and an overbalance may be positioned diametrical to the pendulum mounting. A line drawn from the center of gravity of the overbalance and the pendulum pivot would intersect the longitudinal axis of the assembly. The pendulum is free to swing in the plane so defined.

The rotatable frame, overbalance, and pendulum constitute a unit which is adapted to rotate in such a manner that the pendulum is capable of maintaining a vertical position irrespective of the inclination of the assembly.

The lower end of the pendulum carries a marker of suitable construction adapted to trace a recording line on a strip of graph paper. The weight of the pendulum is such that it will not be held by friction between the marker and the tape. Nevertheless, the pendulum is heavy enough so that it will mark the tape at all times whenever there is any movement relative to the tape. As the well deviates from the vertical, the rotatable frame will maintain an operable position and a permanent record of the deviation will be traced upon the graph paper. The pendulum point is kept in marking contact with the tape or chart during all swinging movements of the pendulum and the change in direction of the well will be recorded by a tracing on the graph.

The recording tape or strip travels at a predetermined rate over a supporting marker plate and is moved by some means such as an electric or spring driving mechanism. The driving mechanism may be suitably positioned in the bottom of the recording chamber. In one embodiment the tape passes from a supply spool over an aligning or guide roller, across a marker plate or table and onto a driven receiving spool. In this embodiment the marker plate over which the tape passes is in substantially the same plane as that in which the pendulum is free to swing. However, when the graph or chart is carried by a rotating disc, it is preferably mounted in a plane substantially perpendicular to the plane in which the pendulum swings. In such an embodiment of our invention, the pendulum arm is of variable length so as to maintain contact with the disc.

When the well bore departs from the vertical, the assembly containing the measuring and recording mechanism will assume a corresponding inclination. This deviation from the vertical will cause the overbalance to assume a position on the lower side of the well bore. Simultaneously, the pendulum will maintain its vertical position and a tracing will be made upon the recording tape. If there is no deviation from the vertical, the pen marker carried by the pendulum traces a straight line parallel to the longitudinal axis of the assembly. When the frame turns, however, due to the drift or deviation which causes the overbalance to move to the lower side of the bore hole, a tracing is made at the depth and time indicated by the tape which shows completely the direction and degree of the deviation. The change in deviation from the vertical is indicated on the disc-type of chart by a break in the smooth concentric curves which represent the angle of deviation.

A part of the recording mechanism may be actuated by the ballast release trap. Referring to Figures II and IV, as the piston 4 reaches its lowermost position, contacts 5 and 5a complete an electrical circuit. This circuit may include some recording means which indicates the moment at which the assembly reached the bottom of the well hole. Such a recording means may be controlled by a solenoid, for example. The solenoid may be adapted to control the graph driving mechanism or to actuate an auxiliary marker which would indicate on the tape when the assembly reached its lowermost point. Such a second marker may trace an auxiliary record and in some embodiments identify the log of the well made on the return of the assembly. Thus, positive information regarding the time of travel within the well, the actual moment at which the assembly reached the well bottom, the depth of the drill hole and the deviation of the various sections from the vertical may be determined from the data available.

Figures II, III, and IV represent one embodiment of our invention wherein the submerging or control chamber comprises a ballast release trap, a ballast chamber, and a shock absorber. The complete chamber is connected to the lower end of the assembly by tooled connection 3.

The shock absorber may be of any suitable construction and, in the embodiment represented in the drawings, comprises a coil spring 6 which is attached to boss 7 engaging the release rod 10. A second coil spring 9 may be disposed about the release rod 10 to urge the shock absorber assembly away from the submerging chamber and to hold the release mechanism in a relatively fixed position. When the assembly strikes the bottom of the well, the coil springs 6 and 9 compress and serve as a shock absorber. The release rod 10 and the shock absorber springs carried thereby, should not be long enough to strike the drill pipe and thus prematurely actuate the release mechanism. Other modifications of the shock absorber will become apparent to those skilled in the art.

Release rod 10 is pin-connected at 13 to modified bell-crank 14. Bell-crank 14 is connected by pivot 12 to bracket 17. Rod 10 is free to pass through packing gland 38 and bell-crank 14 turns about pivot 12 in response to the longitudinal movement of release rod 10. One arm of the bell-crank 14 is provided with socket 16 adapted to engage pin or ball 18. The other arm of the bell-crank is of variable length to permit the substantially longitudinal movement of release rod 10 and in the drawings, slot 40 is provided for this purpose. The socket engaging male member 18 may be an integral part of seat pin 19. Drilled sleeve 15 is provided for guiding seat pin 19 which moves in response to the longitudinal displacement of release rod 10.

Rod 20 supports and guides piston 4 which is provided with grooves 30 for packing or rings. Packing glands or other sealing means may be provided at 38 and 39 to protect the release mechanism from the well fluid. The seat pin 19 and guide sleeve 21 cooperate to support the rod 20 and piston 4 in an operable position. Spring 26 may be provided to hold the seat pin 19 in a normally operable position but does not interfere with the movement of the pin in response to the impact. Release springs 22 and 23 are provided to urge the piston 4 downward, sleeve 21 and packing gland 38 guiding the rod and piston in the fall from the closed position.

A plurality of ports 29 are provided to permit the release of the ballast material. Pressure equalizing ports 31 permit the free flow of the ballast material from ports 29. The ports 31 may be provided with a closing means such as a sleeve valve responsive to the movement of piston 4 or may be a freely moving plug above the ballast which permits the equalization of pressure on the ballast but does not permit the ballast to leave the chamber by way of equalizing ports 31. In a preferred embodiment shown in Figures IV and V, however, the valve comprises an annular member 32 free to slide within the chamber 28 in response to the movement of piston 4 and adapted to close equalizing ports 31. This element 32 is supported by spider 36 and rod 37 and secured by nut 25.

When the assembly strikes the bottom of the well, the impact forces release rod 10 upward causing the bell-crank arrangement to withdraw the seat pin 19 and permit the downward movement of the piston 4 and the member 32, exposing ports 29 and 31. The ports remain open permitting the ballast to flow from the ballast chamber 28 and the piston 4 no longer obstructs the flow of the ballast. It is impossible for the ports to close inadvertently.

While we have described specific methods of releasing the ballast, other means may be used such as pressure, electrical or detonating types. Also other modifications of our spring actuated release may be used.

Referring to Figure I, our buoyant body or lifting chamber 33 may be a housing of any material capable of withstanding the pressures encountered within the well and of sufficient size to lift the assembly after release of the ballast. So that the entire assembly will be buoyant in the well fluid, which may or may not be circulating, the various sections or chambers preferably are constructed, in whole or in part, of a light metal alloy such as an aluminum alloy. In some cases it is found advantageous to construct the chamber of a solid wood cylinder or any suitable substance that would lift the assembly. When a metal housing is used, the ends of the lifting chamber may be provided with suitable plugs welded or threaded therein to prevent the entrance of the well fluid. In one embodiment, a threaded member 41 similar to male members at 2 and 3 is provided on top of lifting chamber 33. Thus, additional lifting sections conveniently may be added or removed to regulate the fall and rise of the assembly within the drill pipe. This permits the use of a ballast material of varying density and also makes possible the logging of wells containing fluids of widely different densities. The threaded member 41 may also be used to assist in the recovery of the assembly if the ballast release mechanism should fail or if the assembly should become lodged within the well bore.

Our lifting chamber 33 has been shown as being adapted to be fitted to the recording chamber 1 by means of fluid-tight threaded connection 2. It is contemplated that each chamber may be fluid-tight in itself and that each of the chambers may be joined by other means.

The operation of our apparatus may be as follows:

The piston 4 is positioned to close the lower end of chamber 28 and the seat pin 19 supports the rod 20 and piston in such position. The ballast material is charged into the submerging chamber, the member 32 is inserted and the plug 34 threaded in. The three sections comprising the lifting, recording and submerging chambers are joined and the assembly as represented in Figure I is ready to be dropped into the drill pipe.

As the apparatus drops through the well, the centering arms 35 coact to maintain the assembly in a position parallel to the axis of the drill pipe and to assure free movement of the assembly through the pipe. All along its path the recording instrument makes a continuous and complete record of the deviation of the well hole from the vertical. On reaching the bottom, the impact releases the ballast and the bottom of the well is recorded by marking the tape or stopping the clocking or driving mechanism. Upon release of the ballast, the assembly returns to the surface. In some instances it will be preferable merely to mark the tape and take a second recording on the return of the assembly which can be correlated with the first recording. Such a correlation could be made directly by having a composite graph strip or disc that is designed to compensate for the difference in speed between the descent and ascent.

A number of different uses for our assembly is contemplated The recording chamber may include instruments for the measuring of pressure or temperature in addition to the deviation from the vertical. Our assembly may also be used to carry any one or any combination of such instruments. When it is not desired to obtain a logging of the well, the recording chamber may be omitted from the assembly and only the submerging chamber and lifting chamber used. By selecting a suitable ballast material, the ballast material may cement the well, acid treat, color the drilling mud when released, etc. When a colored liquid or soluble granular coloring substance is used as a ballast, release of the balast affords a method for determining the depth of the well by noting the time necessary for the colored mud to reach the surface. Our ballast may be any fluid having a density greater than that of the fluid in the well and may be either a free-flowing solid or a liquid.

Although we have shown and described certain embodiments of our invention, it is to be understood that various modifications may be made without departing from the spirit of our invention.

What we claim is:

1. A carrier adapted to pass by gravity within a well bore, comprising a ballast chamber including a shell having discharge ports at its lower end, a movable closure within said chamber comprising a piston movable to occupy an upper ballast retaining position and a lower ballast releasing position, a rigid member supporting said piston, a key securing said member and piston in a normal ballast retaining position, an impact absorbing means extending longitudinally from said ballast chamber, and a bell crank coacting therewith to withdraw said key to permit said piston to assume a ballast releasing position.

2. A carrier adapted to pass by gravity within a well bore, comprising a ballast chamber including a shell having discharge ports at its lower end, a closure within said chamber comprising a piston movable to occupy an upper ballast retaining position and a lower ballast releasing position, a rigid member supporting said piston, a key normally engaging the rigid member and securing the piston in the upper ballast retaining position, an impact absorbing rod extending longitudinally from the ballast chamber and a bell crank coacting therewith to withdraw said key.

3. A carrier adapted to pass by gravity within a well bore, comprising a ballast chamber including a shell having discharge ports at its lower end, a closure within said chamber comprising a piston movable to occupy an upper ballast retaining position and a lower ballast releasing position, a rigid member supporting said closure, a key normally engaging the rigid member and securing the piston in the upper ballast retaining position, means for urging said key in an operative position, an impact absorbing rod extending from the ballast chamber, means for urging the normal extension of said impact rod, and a bell crank actuated by the displacement of said rod to withdraw said key.

4. An instrument carrier adapted to pass within a well bore under the influence of gravity comprising a buoyant body and a submerging chamber connected to said body, a fluid ballast within said chamber, said chamber including a shell having discharge ports at its lower end, a closure within said chamber movable to occupy an upper ballast retaining position and a lower ballast releasing position, a rigid member supporting said closure, a key securing said member and closure in the normal upper ballast retaining position, spring means for urging said key in an operative position, an impact absorbing rod extending downwardly from the said submerging chamber, spring means for urging the normal extension of the impact rod, said impact rod coacting with means for withdrawing the said key when the assembly strikes an obstruction.

5. A carrier adapted to pass by gravity within a well bore, comprising a buoyant body and a submerging chamber connected to said body, a fluid ballast within said chamber, said chamber including a shell having ballast discharge ports at its lower end and venting ports at its upper end, a first closure means movable within said chamber to occupy a ballast retaining position and a lower ballast releasing position, a second closure means comprising an annular member connected to the said first movable closure and being movable to occupy an upper vent-closing position and a lower venting position, a rigid member supporting said movable closing means, a key normally engaging the said rigid member, means urging said key in an operative position, an impact absorbing rod extending from the ballast chamber, means for urging the normal extension of said rod, and a bell crank actuated by the displacement of said rod to withdraw the said key.

6. A carrier adapted to pass by gravity within a well bore, comprising a buoyant body and a submerging chamber secured to said body, said submerging chamber including a shell having discharge ports, a movable ballast supporting closure within said chamber adapted to occupy an upper ballast retaining position and a lower ballast releasing position, internal means coacting with the said ballast supporting closure to support said closure in a ballast retaining position, means exterior of said chamber but associated therewith adapted to release said internal means and to permit movement of said closure to ballast releasing position.

7. A carrier adapted to pass by gravity within a well bore comprising a ballast chamber including a shell having discharge ports, a movable ballast supporting closure within said chamber comprising a piston movable to occupy an upper ballast retaining position and a lower ballast releasing position, internal means coacting with the said ballast supporting piston to support said piston in a ballast retaining position, means exterior of said chamber but associated therewith adapted to release said internal means and to permit movement of said closure to ballast releasing position.

EUGENE DAVIS WILCOX.
JOHN RICHARDSON WILCOX.